US009876236B2

(12) United States Patent
Hood et al.

(10) Patent No.: US 9,876,236 B2
(45) Date of Patent: Jan. 23, 2018

(54) FUEL CELL SEPARATOR PLATES

(71) Applicant: INTELLIGENT ENERGY LIMITED, Loughborough, Leicestershire (GB)

(72) Inventors: Peter David Hood, Loughborough (GB); Paul Leonard Adcock, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 465 days.

(21) Appl. No.: 14/345,928

(22) PCT Filed: Sep. 20, 2012

(86) PCT No.: PCT/GB2012/052323
§ 371 (c)(1),
(2) Date: Mar. 19, 2014

(87) PCT Pub. No.: WO2013/041866
PCT Pub. Date: Mar. 28, 2013

(65) Prior Publication Data
US 2014/0227630 A1    Aug. 14, 2014

(30) Foreign Application Priority Data
Sep. 21, 2011   (GB) .................................. 1116282.3

(51) Int. Cl.
*H01M 8/026* (2016.01)
*H01M 8/0254* (2016.01)
(Continued)

(52) U.S. Cl.
CPC ......... *H01M 8/026* (2013.01); *H01M 8/0254* (2013.01); *H01M 8/0258* (2013.01); *H01M 8/0265* (2013.01)

(58) Field of Classification Search
None
See application file for complete search history.

(56) References Cited

U.S. PATENT DOCUMENTS

| 6,099,983 A | 8/2000 | Nakagaki et al. |
| 7,855,028 B2 | 12/2010 | Ryu et al. |
| 2010/0310957 A1 | 12/2010 | Sugiura et al. |

FOREIGN PATENT DOCUMENTS

| JP | 62100868 | 1/1987 |
| JP | 1235160 | 9/1989 |

(Continued)

OTHER PUBLICATIONS

Great Britain Search Report dated Nov. 23, 2011, issued in Great Britain patent application 1116282.3.
(Continued)

*Primary Examiner* — Miriam Stagg
*Assistant Examiner* — Carmen Lyles-Irving
(74) *Attorney, Agent, or Firm* — Baker & Hostetler LLP

(57) ABSTRACT

The invention relates to separator plates (108) for fuel cells, and in particular to separator plates having particular geometries for improved edge sealing properties. Exemplary embodiments of the invention include a fuel cell separator plate (308) having first and second opposing faces (304, 305), the separator plate having a series of corrugations (301) extending, and providing air flow paths (302), between first and second opposing edges of the plate, wherein crests of corrugations along the first face (304) proximate the first edge (303) of the plate are depressed to be coplanar with adjacent crests of corrugations along the second face such that a greater contact surface on the second face (305) is provided compared with the first face (304).

8 Claims, 5 Drawing Sheets

(51) Int. Cl.
*H01M 8/0258* (2016.01)
*H01M 8/0265* (2016.01)

(56) References Cited

FOREIGN PATENT DOCUMENTS

| | | |
|---|---|---|
| JP | 07254424 | 10/1995 |
| JP | 08180883 | 7/1996 |
| JP | 10092447 | 4/1998 |
| JP | 2002100381 | 5/2002 |
| JP | 2005032591 | 3/2005 |
| JP | 2006054198 | 2/2006 |
| JP | 2007048616 | 2/2007 |
| JP | 2008147155 | 6/2008 |
| WO | 0002276 | 1/2000 |

OTHER PUBLICATIONS

International Search Report dated Dec. 17, 2012, issued in International patent application PCT/US2012/052323.

FUEL CELL SEPARATOR PLATES

The invention relates to separator plates for fuel cells, and in particular to separator plates having particular geometries for improved edge sealing properties.

In open cathode fuel cell stacks, air flow is directed across the cathode side of each fuel cell, so that oxidant is available to the cathode side of the membrane-electrode assembly (MEA) of the fuel cell, typically via a diffusion layer. To achieve a uniform flow of air across an entire stack, a common arrangement is to flow air in parallel across the cell stack between opposing faces of the stack, so that air flows across each cell from one edge to an opposing edge.

A typical way of achieving a sufficient degree of air flow across each cell of a stack, while keeping the overall weight of the stack down, is through using corrugated cathode separator plates. Such separator plates act both to form an electrical connection with the cathode side of the fuel cell electrolyte and to provide pathways for air flow across an underlying diffuser layer.

A problem with using conventional corrugated cathode separator plates is that, at the open edges of each cell, there is only an intermittent connection with the underlying electrolyte layer and any intervening gasket material. This can result in separation of the underlying layers, for example during thermal cycling of the stack, which may eventually cause leakage. Gaps between contacts with the underlying layers of the cell could be made smaller by for example making the corrugation pitch smaller, but this would have the effect of reducing the volume of air flow paths available across the cell. Another possible way of reducing the possibility of leakage would be to increase the width of a gasketed region surrounding an active region of the fuel cell. This would, however, reduce the proportion of the active area of the cell, and thereby reduce the efficiency of the cell. This is a particular problem for smaller form fuel cell stacks, where the edge gasket region will generally form a higher proportion of the overall cell area.

It is an object of the invention to address one or more of the above mentioned problems.

In accordance with a first aspect of the invention there is provided a fuel cell separator plate having first and second opposing faces, the separator plate having a series of corrugations extending, and providing air flow paths, between first and second opposing edges of the plate, wherein crests of the corrugations along the first face proximate the first edge of the plate are depressed to be coplanar with adjacent crests of the corrugations along the second face such that a greater contact surface on the second face is provided compared with the first face.

An advantage of the invention is that of a greater surface area being provided along edge regions of the separator plate. This allows for a more uniform sealing pressure against an underlying sealing region, for example against a gasket. This reduces the possibility of leakage within the underlying membrane electrode assembly without adversely affecting the air flow passages through the separator plate.

The crests of corrugations of the separator plate may be depressed in a number of different ways to achieve the same object. An exemplary selection of embodiments is provided herein.

In certain embodiments, the crests may be depressed by the corrugations being cut along a cut line in a direction transverse to the air flow paths along the separator plate parallel to the edge of the plate, crests of the corrugations being depressed between the cut line and the edge of the plate. Each region comprising a depressed corrugation crest may comprise one or two double folds of the plate material. The double folds may be folded over towards the second face and away from the respective air flow path. Folding over the double folded portions has the advantage of moving material away from the air flow paths of the separator plate, and thereby increasing the available air flow across the plate during use, or at least preventing the double folded regions being an obstruction to air flow through the plate.

In certain embodiments regions of depressed corrugation crests may define a channel in the first face of the plate parallel to the first edge of the separator plate. In such embodiments a sealing portion along the second face aligned with the channel can be supported on either side of the channel by pressure applied from the first face when assembling the cell, rather than from only one side in embodiments where only a cut line is used. This allows for a further improved seal against underlying layers of the cell.

In embodiments where one double folded portion is formed for each region comprising a depressed corrugation crest, the double folded portion is preferably folded away from the respective air flow path and towards the second face of the plate. This increases the available volume of the air flow path. Using only one double folded portion has a further advantage that the sealing surface available on the second face is further increased relative to embodiments where two double folded regions are formed.

In accordance with a second aspect of the invention there is provided a method of forming a fuel cell separator plate comprising the steps of:

applying a series of corrugations extending, and providing air flow paths, between first and second opposing edges of the plate; and depressing crests of corrugations along the first face proximate the first edge of the plate to become coplanar with crests of corrugations along the second face so as to provide a greater contact surface on the second face compared with the first face.

The method may comprising cutting the plate along the first face in a cut line parallel to the first edge of the plate, wherein the crests of corrugations are depressed between the first edge and the cut line.

The method may further comprise forming two double folds of the plate material for each region comprising a depressed corrugation crest, or alternatively forming only one double fold of the plate material for each region comprising a depressed corrugation crest. In either case, each double fold may be folded over towards the second face and away from a respective air flow path.

Regions of depressed corrugation crests may define a channel in the first face parallel to the first edge of the plate.

The method may comprise depressing crests of the corrugations along the first face proximate the second edge of the plate to become coplanar with crests of the corrugations along the second face.

Aspects and embodiments of the invention are described in further detail below by way of example and with reference to the enclosed drawings in which.

Figure 1:
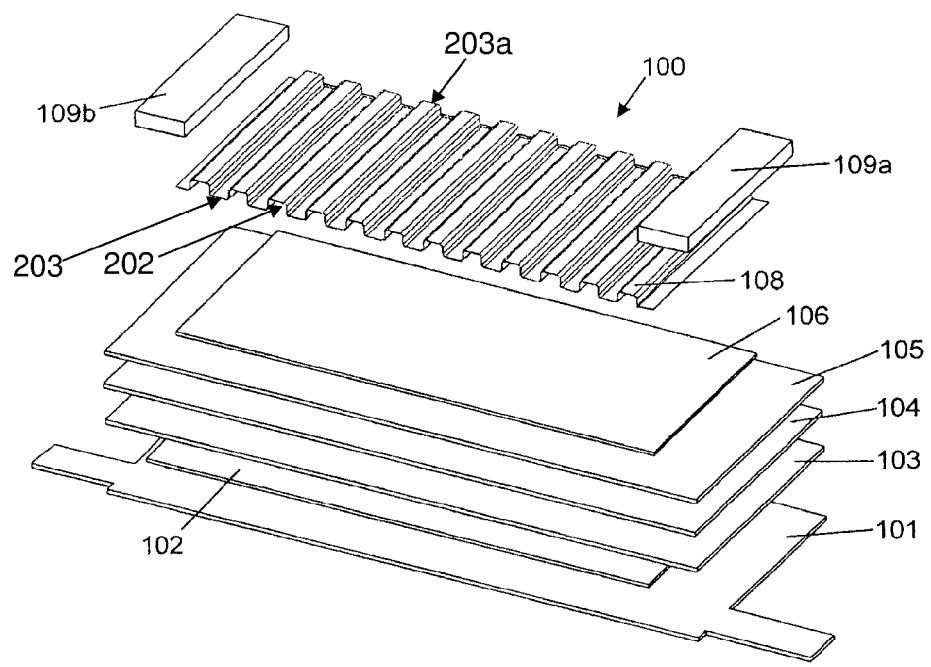
FIG. 1 is an exploded schematic perspective view of an exemplary fuel cell with a corrugated cathode separator plate.

Illustrated in FIG. 1 is an exploded perspective view of an exemplary fuel cell assembly 100. The fuel cell assembly 100 comprises, in sequential order, an anode plate 101, an anode side diffuser layer 102, an anode gasket 103, a membrane electrode assembly (MEA) 104, a cathode gasket 105, a cathode side diffuser layer 106, a corrugated cathode separator plate 108 and a pair of manifold gaskets 109a, 109b for supplying fuel to the anode side of the cell.

The corrugated cathode separator plate 108 provides only intermittent support over the gasket 105. In regions where the plate 108 does not contact the underlying gasket 105, i.e. regions where air flow paths are provided through the plate, the gasket 106 is not under as much compressive pressure as where the plate 108 provides direct contact. A result of this reduced pressure is that the underlying gaskets 103, 105 may partly separate from adjacent layers. In some circumstances this can result in leaks.

Figure 2:
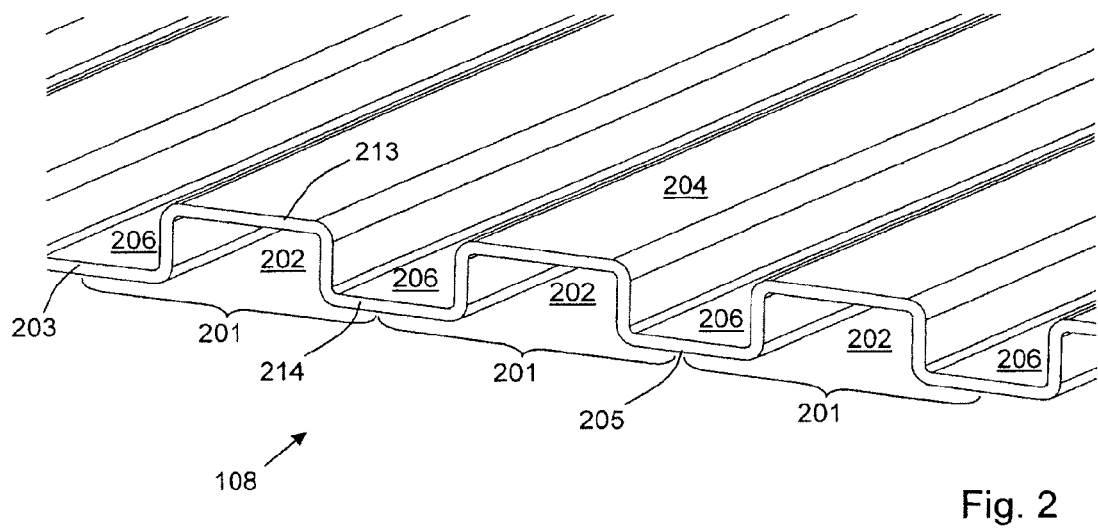
FIG. 2 is a detail perspective view of an edge portion of a corrugated cathode separator plate.

FIG. 2 illustrates the general form of an exemplary corrugated cathode separator plate 108 for use in the fuel cell assembly 100 of FIG. 1, the plate 108 having first and second opposing faces 204, 205. The plate 108 has a series of corrugations 201 extending, and providing air flow paths 202, between first edges 203 and second edges 203a of the plate, the first edge 203 and the second edge 203a being opposite one another the first edge 203 of which is shown in FIG. 2. Each corrugation 201 in the plate 108 comprises a crest 213 on the first face 204 of the plate 108 and a crest 214 on the opposing second face 205 of the plate 108. A second opposing edge 203a of the plate 108 will generally have the same or similar form. Air flow paths 202 defined between crests 213 on the first face 204 and the second face 205 provide passages for air to pass along the plate between the plate and the underlying diffuser layer 106 of the cell assembly for providing oxidant to the cathode side of the MEA 104. Other air flow paths 206 defined between crests 214 on the second face and the first face 204 allow air to pass along the plate 108 between the plate 108 and an adjacent cell to provide cooling.

Figure 3:
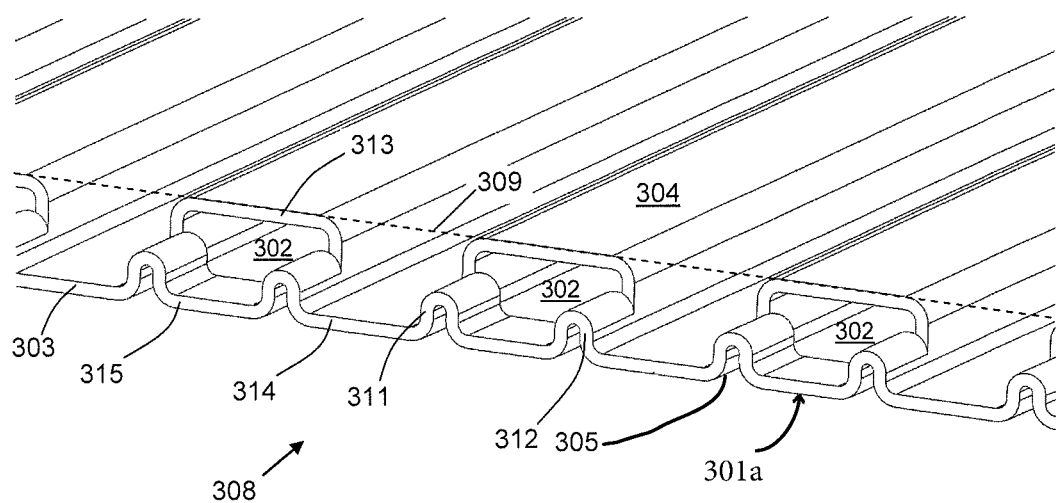
FIG. 3 is a detail perspective view of a first embodiment of a corrugated cathode separator plate according to the invention.

FIG. 3 illustrates a first embodiment of a cathode separator plate 308, in which crests 313 along the first face 304 proximate the first edge 303 of the plate 308 are depressed to form a depressed region 315 that is substantially coplanar with crests 314 on the second face 305 such that a greater contact surface on the second face 305 is provided compared with the first face 304. The crests 313 at the first edge 303 of the plate 308 are depressed between the first edge 303 and a cut line 309 parallel to the first edge 303 of the plate 308 and transverse the air flow paths 302. In this embodiment, each depressed crest 315 comprises two double folds 311, 312 of the plate material, i.e. regions where the plate material has been folded back on itself. The result of this is an increase in the contact surface area available over the second face 305 along the first edge 303 of the plate 308, which provides a better sealing surface 301a against an underlying gasket. The depressed crests 315 need not be exactly coplanar with the second face but sufficiently coplanar to allow for the required effect of an improved sealing surface on the second face 305.

Figure 4:
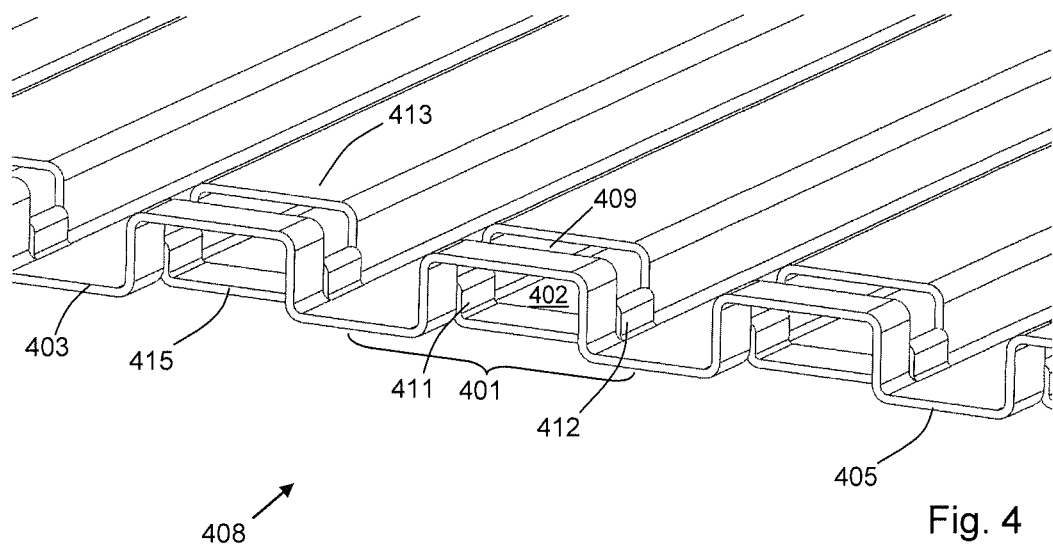
FIG. 4 is a detail perspective view of a second embodiment of a corrugated cathode separator plate.

FIG. 4 illustrates a second embodiment of a corrugated cathode separator plate 408, in which a similar series of depressed crests 415 of corrugations on the first face are provided to those of the embodiment in FIG. 3. In this case, however, the crests 413 are depressed to define a channel 409 proximate the first edge 403 of the plate 408, the channel 409 running parallel with the edge 403 of the plate 408. As with the embodiment of FIG. 3, two double folded regions 411, 412 are formed in each region where a crest is depressed. This arrangement allows for a more uniform pressure to be applied to an underlying gasket, because pressure can be applied to the second face 405 of the plate 408 from either side of the channel 409 across the depressed crests 415.

Figure 5:
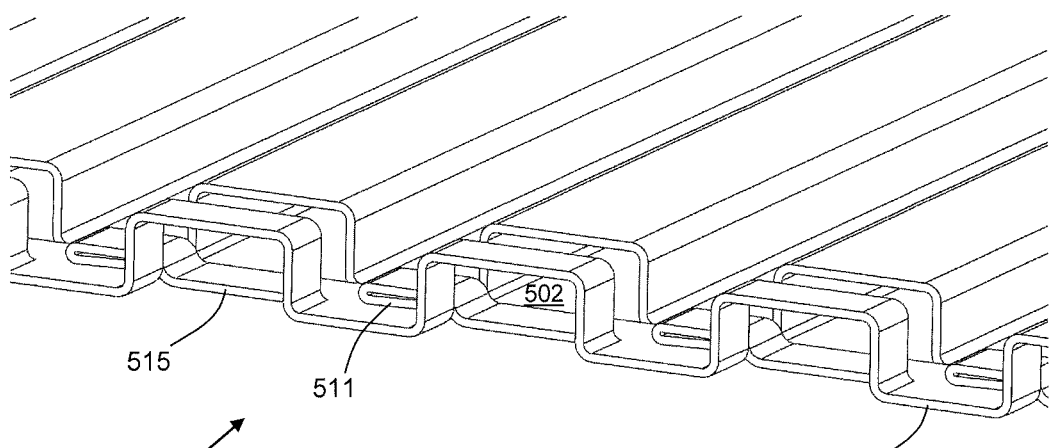
FIG. 5 is a detail perspective view of a third embodiment of a corrugated cathode separator plate.

FIG. 5 illustrates a third embodiment of a cathode separator plate 508 in which, instead of two double folded portions 411, 412 or 311, 312 in the embodiments of FIGS. 4 and 3 respectively, only a single double folded portion 511 is formed for each of the depressed crests 515. This arrangement has the advantage that a greater surface area is available across the second face 505 of the plate 508 for contacting with an underlying gasket. The double folded regions 511 are preferably folded over towards the second face 505 and away from a respective air flow path 502, so as to reduce any obstructive effect on the oxidant supply to the cathode side of the fuel cell.

Figure 6:
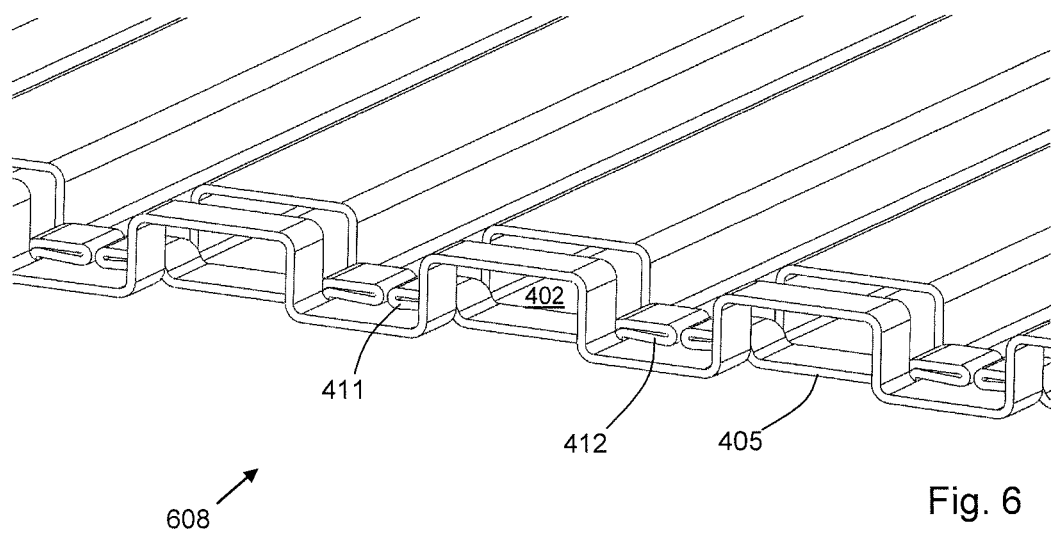
FIG. 6 is a detail perspective view of a fourth embodiment of a corrugated cathode separator plate.

FIG. 6 illustrates a fourth embodiment of a cathode separator plate 608 in which the double folded regions 411, 412 in the embodiment of FIG. 4 have been folded over towards the second face 405 of the plate 408 and away from the air flow passages 402. As with the embodiment of FIG. 5, folding the double folded regions 411, 412 away from the air flow passages 402 reduces any obstructive effect on the oxidant supply to the cathode side of the fuel cell in which the separator plate 608 is used.

Figure 7:
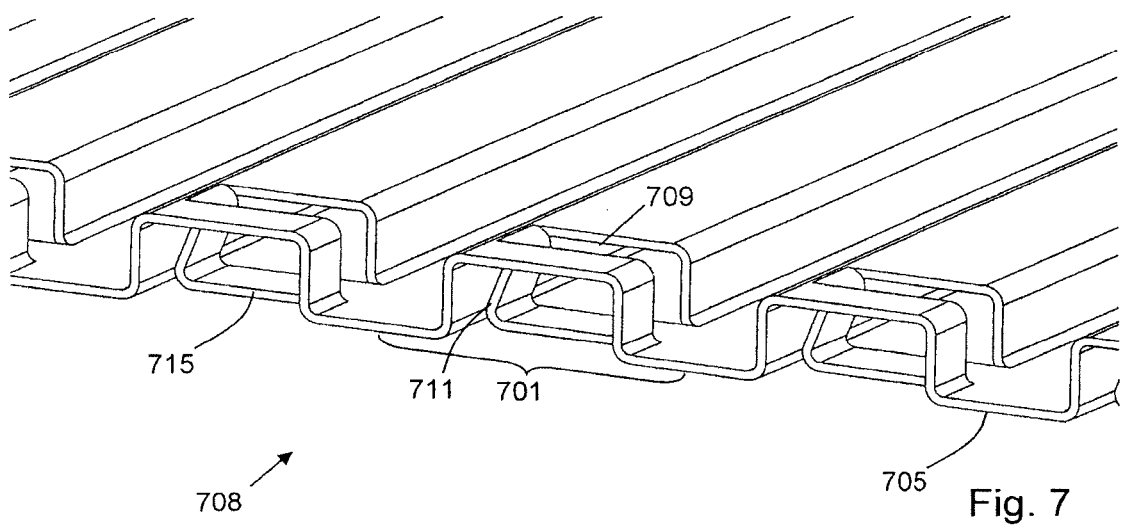
FIG. 7 is a detail perspective view of a fifth embodiment of a corrugated cathode separator plate.

FIG. 7 illustrates a fifth embodiment of a cathode separator plate 708, in which, as with the embodiment of FIG. 5, the depressed crest 715 of each corrugation 701 has a single double folded portion 711. The double folded portion is, however, in this embodiment, not folded towards the second face 705 of the plate 708, as the channel 709 provided transverse the air flow passages 702 is intermittent rather than continuous as in the embodiments of FIGS. 4, 5 and 6.

Figure 8:
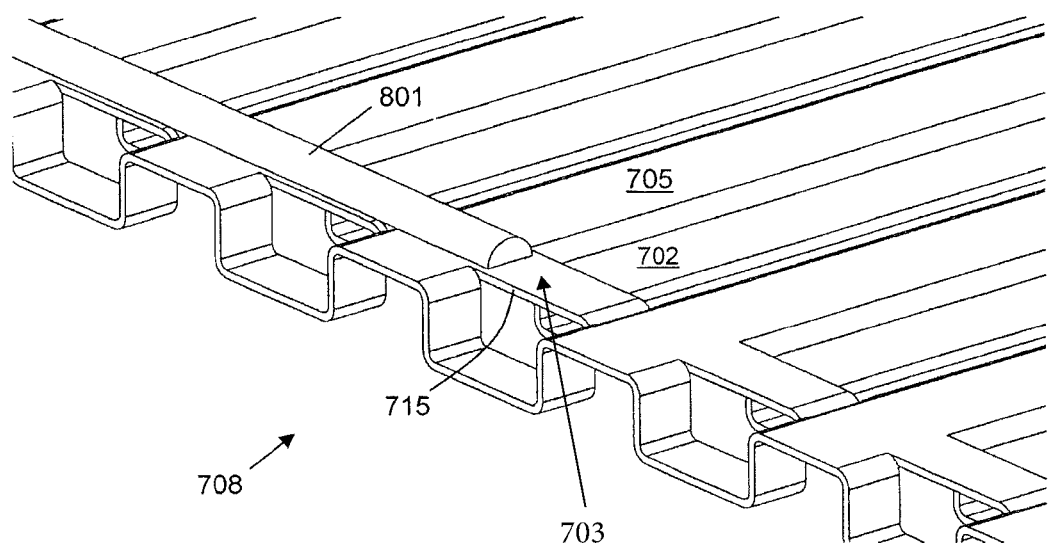
FIG. 8 is a detail perspective view of the fifth embodiment with a bead of gasket material applied along a sealing region of the second surface of the plate.

FIG. 8 illustrates a view of the second face 705 of the fifth separator plate embodiment of FIG. 7. A bead 801 of a sealant material, such as a liquid gasket or adhesive compound, is provided along the second face 705 across the depressed crests 715 defining a sealing region 703 (as it appears in FIG. 8). Without the depressed crests 715, applying such a bead 801 across the plate 708 would either not be possible or would not be reliable. Because the depressed crests, being coplanar with the second face 705, form a nearly continuous surface across the second face 705 of the plate, the bead 801 can be applied without affecting the adjacent air flow passages 702 that have to be kept open to allow an oxidant supply to pass across the plate 708.

The separator plates according to the above described embodiments of the invention may be fabricated by a number of methods. In preferred fabrication methods, corrugations are first applied to a planar feedstock plate material, which may be stainless steel, by passing the plate through a pair of gear-toothed rollers with a defined pitch configured to form corrugations in the plate. A stamping process between opposing plates then forms the exact shape of the corrugated plate. Either in this stamping process or as a separate process, crests of corrugations along the first face of the plate may be depressed to become coplanar with the second face. For plates according to the third and fourth embodiments, a further stamping process is required to deform the double folded regions 511, 411, 412 towards the second face 405, 505 of the plate 508, 608.

Figure 9:
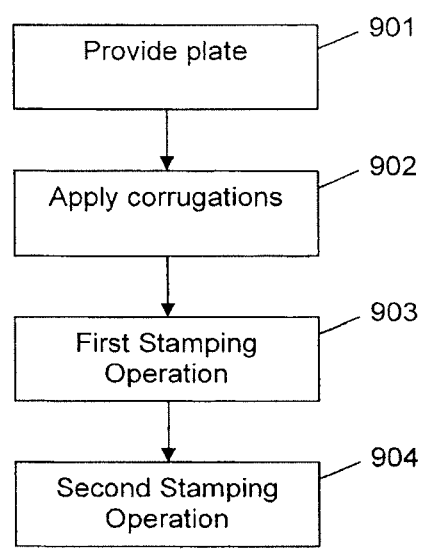
FIG. 9 is a flow chart illustrating an exemplary method according to an aspect of the invention.

FIG. 9 illustrates an exemplary series of steps of processing operations in accordance with a method according to an embodiment of the invention. A feedstock plate is provided (step 901), which is then processed to form a series of corrugations (step 902). In a first stamping operation (step 903), crests of corrugations along the first face of the plate are depressed to become coplanar with the second face, as outlined in the embodiments of FIGS. 3 and 4. In an optional second stamping operation (step 903), double folded regions are bent over towards the second face of the plate, as in the embodiments of FIGS. 5 and 6. In some embodiments, steps 901 and 902 may be combined in a single stamping operation.

Other embodiments are intentionally within the scope of the invention as defined by the appended claims.

The invention claimed is:

1. A fuel cell separator plate having first and second opposing faces, the separator plate having:
    a series of corrugations extending, and providing air flow paths, between a first edge and a second edge of the plate, wherein the first edge and the second edge oppose one another and
    the first edge and the second edge being configured to seal against a sealing region;
    wherein crests of the corrugations along the first face in the first edge region of the plate are depressed to be coplanar with adjacent crests of the corrugations along the second face such that a greater contact surface on the second face is provided compared with the first face, and
    wherein each of the first edge and the second edge includes a depressed corrugation crest having at least one double fold of the plate material,
    wherein the double fold of the plate material comprises plate material that is folded back on itself.

2. The fuel cell separator plate of claim 1 wherein the crests of the corrugations along the first face are depressed between the first edge and a cut line parallel to the first edge of the plate and transverse the air flow paths.

3. The fuel cell separator plate of claim 1 wherein the depressed corrugation crest in the first edge of the plate comprises two double folds of the plate material.

4. The fuel cell separator plate of claim 3 wherein each double fold is folded over towards the second face and away from a respective air flow path.

5. The fuel cell separator plate of claim 1 wherein a plurality of depressed corrugation crests define a channel in the first face parallel to the first edge of the plate.

6. The fuel cell separator plate of claim 1 wherein the depressed corrugation crests along the first face in the first edge of the plate are depressed to be coplanar with adjacent crests of the corrugations along the second face.

7. The fuel cell separator plate of claim 2 wherein the depressed corrugation crest in the first edge of the plate comprises two double folds of the plate material.

8. The fuel cell separator plate of claim 2 wherein the depressed corrugation crest in the first edge of the plate comprises only one double fold of the plate material.

* * * * *